United States Patent
Yao

(10) Patent No.: US 7,768,276 B2
(45) Date of Patent: Aug. 3, 2010

(54) SYSTEMS AND METHODS FOR IDENTIFYING PROBLEMS WITH PZT ELEMENTS OF MICRO-ACTUATORS

(75) Inventor: MingGao Yao, DongGuan (CN)

(73) Assignee: Sae Magnetics (H. K.) Ltd., Hong Kong (CN)

( * ) Notice: Subject to any disclaimer, the term of this patent is extended or adjusted under 35 U.S.C. 154(b) by 940 days.

(21) Appl. No.: 11/593,169

(22) Filed: Nov. 6, 2006

(65) Prior Publication Data

US 2008/0106823 A1 May 8, 2008

(51) Int. Cl.
G01R 29/22 (2006.01)
G01R 27/28 (2006.01)
G01R 23/00 (2006.01)

(52) U.S. Cl. .................. 324/727; 324/652; 324/76.49

(58) Field of Classification Search .............. 324/652, 324/649, 600, 727, 109, 76.11, 76.49; 360/294.4, 360/245; 73/579; 310/311, 314, 317
See application file for complete search history.

(56) References Cited

U.S. PATENT DOCUMENTS

| 6,433,459 | B1* | 8/2002 | Okada ........................ 310/317 |
| 6,671,131 | B2 | 12/2003 | Kasajima et al. |
| 6,700,749 | B2 | 3/2004 | Shiraishi et al. |
| 6,861,854 | B1* | 3/2005 | Guo et al. ..................... 324/727 |
| 7,424,827 | B2* | 9/2008 | Yamada et al. ................. 73/579 |
| 2003/0076121 | A1 | 4/2003 | Guo et al. |
| 2003/0168935 | A1 | 9/2003 | Ogawa et al. |

FOREIGN PATENT DOCUMENTS

JP 2002-133803 5/2002

* cited by examiner

*Primary Examiner*—Hoai-An D Nguyen
(74) *Attorney, Agent, or Firm*—Nixon & Vanderhye P.C.

(57) ABSTRACT

Systems and methods for identifying problems with PZT elements of micro-actuators are provided. In certain example embodiments, a voltage (e.g., a sine voltage) may be applied to a reference unit causing it as well as a test unit to vibrate. Characteristics of the respective resonances (e.g., frequency, amplitude, phase, etc.) may be compared (e.g., by a processor) to determine whether there are problems with the test unit. The reference unit may include an HGA or an HSA of a hard disk drive device. The test unit may include corresponding parts for inspection. Such techniques make it possible to detect problems with PZT elements when there is only one PZT element per micro-actuator.

17 Claims, 13 Drawing Sheets

US 7,768,276 B2

SYSTEMS AND METHODS FOR IDENTIFYING PROBLEMS WITH PZT ELEMENTS OF MICRO-ACTUATORS

FIELD OF THE INVENTION

The example embodiments herein relate to information recording disk drive devices and, more particularly, to techniques for identifying problems with PZT elements of micro-actuators of head gimbal assemblies of hard disk drive devices.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate micro-actuators are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803; U.S. Pat. Nos. 6,671,131 and 6,700,749; and U.S. Publication No. 2003/0168935, the contents of each of which are incorporated herein by reference.

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 277 that includes a micro-actuator with a slider 203 incorporating a read/write head. A voice-coil motor (VCM) is provided for controlling the motion of the motor arm 104 and, in turn, controlling the slider 203 to move from track to track across the surface of the disk 101, thereby enabling the read/write head to read data from or write data to the disk 101.

Because of the inherent tolerances (e.g., dynamic play) of the VCM and the head suspension assembly, the slider cannot achieve quick and fine position control which adversely impacts the ability of the read/write head to accurately read data from and write data to the disk when only a servo motor system is used. As a result, a PZT micro-actuator, as described above, is provided in order to improve the positional control of the slider 203 and the read/write head. More particularly, the PZT micro-actuator corrects the displacement of the slider on a much smaller scale, as compared to the VCM, in order to compensate for the resonance tolerance of the VCM and/or head suspension assembly. The micro-actuator enables, for example, the use of a smaller recording track pitch, and can increase the "tracks-per-inch" (TPI) value for the disk drive unit, as well as provide an advantageous reduction in the head seeking and settling time. Thus, the PZT micro-actuator enables the disk drive device to have a significant increase in the surface recording density of the information storage disks used therein.

FIG. 2a shows a conventional U-shaped micro-actuator design. In FIG. 2a, the micro-actuator 105 has a ceramic frame 100, with side arms 107 and 108 having PZT elements 107a and 108a respectively mounted thereon. The PZT micro-actuator 105 is coupled to the tongue of a suspension on the HGA at the bottom of arm 100. A parallel gap (not shown) exists, allowing the micro-actuator 105 to smoothly displace the slider 203 when a voltage is applied to one or more of the PZT elements 107a and 108a.

FIG. 2b shows another conventional U-shaped micro-actuator design. In FIG. 2b, the micro-actuator 105' has a metal frame 213, with top support arm 214, bottom support arm 215, and side arms 211 and 212 having PZT elements 207 and 208 respectively mounted thereon. The bottom support arm 215 is mounted on the suspension tongue. A parallel gap (not shown) exists, allowing the micro-actuator 105' to smoothly displace the slider 203 when a voltage is applied to one or more of the PZT elements 207 and 208.

FIG. 2c illustrates the head gimbal assembly (HGA) 277 incorporating a dual-stage actuator in the conventional disk drive device of FIGS. 1 and 2. More particularly, FIG. 2c is an enlarged perspective view of a conventional HGA of the disk drive from FIGS. 1 and 2. The micro-actuator of FIG. 2b located on a HGA. It will be appreciated that the micro-actuator of FIG. 2a also could be located on the HGA of FIG. 2c, and thus a corresponding description is omitted. In brief, electrical connection balls 109 may be used to operably couple the micro-actuator 105' to the suspension traces 117 on each one side of the PZT elements 207 and 208. The electrical connection balls 109 may be formed by, for example, gold ball bonding (GBB), solder ball bonding (SBB), or the like. In additional, the slider 203 is inserted and mounted on the top support 214 of the metal frame 213, and there are a plurality of electrical connection balls (coupled by GBB, SBB, or the like) to operably couple the slider 203 to the suspension traces 110 for electrical connection with the read/write transducers. When an actuating voltage is applied through the suspension traces 117, PZT elements 207 and/or 208 on side arms 211 and/or 212 will expand and/or contract, causing side arm 211 and/or 212 to bend in a common lateral direction. Thus, the slider 203 undergoes a lateral translation because it is attached to the two side arms. Accordingly, it is possible to attain a fine head position adjustment.

Because micro-actuators have become so prevalent in the industry and so important to the proper functioning of hard disk drives, a need has developed in the art relating to how to identify problems with and/or failures of the PZT element. Such problems may include, for example, the presence of micro-cracks, PZT element deformations, etc. Traditional techniques for detecting problems with the PZT elements involve visual inspection of the PZT. Obviously, these techniques suffer several disadvantages. For example, visual inspection simply is not feasible given, for example, the size and complexity of the PZT elements and HGAs.

Other techniques involve introducing a voltage into one PZT elements and performing capacitance measurement and/or resonance measurement using Laser Doppler Vibrometers (LDV) on another PZT element to detect mechanical resonance characteristics and, in particular, deviations from a predetermined norm. One example is disclosed in U.S. Publication No. 2003/0076121, the contents of which is incorporated in its entirety herein by reference.

In particular, FIG. 3a is a prior art test device 300 for detecting errors on an HGA having two PZT elements. The test device 300 includes a user interface 314 having an associated input mechanism 318 and a display 316, a test control processor 312, a signal generator 308, and a signal analyzer 310. The signal generator 308 is electrically connected (304) to the first of the PZT elements 207 of the micro-actuator of the first arm of the HGA. The signal analyzer 310 is electrically connected (306) to the other PZT element 208 of the micro-actuator of the second side arm. The test control processor 312 instructs the signal generator 308 to output a reference signal at a predetermined voltage (e.g., a swept, sine, period chirp, random noise, etc.). This reference signal will excite the PZT element 207 and cause the first side arm to bend. Because the first arm is coupled to the second arm and the second PZT element is located on the second arm, the second PZT element 208 will bend, thereby generating a response voltage in the PZT element 208. The signal analyzer 310 may detect the response voltage, and the test control processor 312 may compare the reference signal characteristics and the response signal characteristics to predict the characteristics of the micro-actuator.

FIG. 3b is illustrative output from the prior art system of FIG. 3a. The comparison data may shown as a bode plot, which is a convenient way to represent the steady state frequency response of an electronic filter. The graph plots the log of the gain against the log of the frequency. R1 is the output of the electrical signal of the PZT element 207 or 208, and R2 is the expected response signal. If the response signal R1 and the known expected response signal R2 do not match (e.g., the main peak frequency shifts, the gain amplitudes differ, etc.), then there may be PZT element damage or defect because the response characteristics of the PZT elements have changed.

These conventional methods of capacitance and LDV measurement work fairly well for HGAs having two PZT elements in the structure. Unfortunately, they may not work at all when there is a single PZT element in the system. Such a case may arise in the hard disk drive sensor system. Thus, it will be appreciated that there is a need in the art for an improved system that does not suffer from one or more of the above-mentioned drawbacks.

SUMMARY OF THE INVENTION

One aspect of the example embodiments described herein relates to techniques for detecting defects in a PZT element of a micro-actuator found in a hard disk drive unit.

A further aspect of the example embodiments described herein relates to the ability to detect defects when there is at least one PZT element located on a micro-actuator.

In certain example embodiments, a system for identifying problems with a PZT element of a micro-actuator is provided. A voltage driver may be operably connected to a reference micro-actuator. The voltage driver may be configured to cause the reference micro-actuator to vibrate at a reference resonance. A test micro-actuator may be configured to vibrate at a test resonance when induced by vibrations from the reference micro-actuator. A processor may be configured to compare at least one characteristic of the reference resonance and at least one corresponding characteristic of the test resonance.

In certain other example embodiments, a method for identifying problems with a PZT element of a micro-actuator is provided. A reference micro-actuator and a test micro-actuator may be provided. A voltage may be applied to the reference micro-actuator to induce a reference resonance in the reference micro-actuator, such that the reference resonance may cause a test resonance in the test micro-actuator. The reference resonance and the test resonance may be measured. At least one characteristic of the reference resonance and at least one corresponding characteristic of the test resonance may be compared.

In yet other example embodiments, a method for identifying problems with a PZT element of a micro-actuator of a disk drive device including a head stack assembly including a plurality of head gimbal assemblies, with each head gimbal assembly having a slider with a read/write head thereon and a drive arm connected to the head gimbal assembly, is provided. A voltage may be applied to the head stack assembly to induce resonances in each micro-actuator. The induced resonances in each micro-actuator may be measured. A reference resonance may be generated. At least one characteristic of the induced resonances may be compared with at least one corresponding characteristic of the reference resonance.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3b is illustrative output from the prior art system of FIG. 3a;

DETAILED DESCRIPTION OF ILLUSTRATED EMBODIMENTS

Certain example embodiments provide techniques for identifying problems (e.g., micro-cracks, deformations, etc.) in the PZT elements of micro-actuators. A voltage (e.g., a sine voltage) may be applied to a reference unit causing it as well as a test unit to vibrate. Characteristics of the respective resonances (e.g., frequency, amplitude, phase, etc.) may be compared (e.g., by a processor) to determine whether there are problems with the test unit. The reference unit may include an HGA or an HSA of a hard disk drive device. The test unit may include corresponding parts for inspection. Such techniques make it possible to detect problems with PZT elements when there is only one PZT element per micro-actuator.

Figure 1:
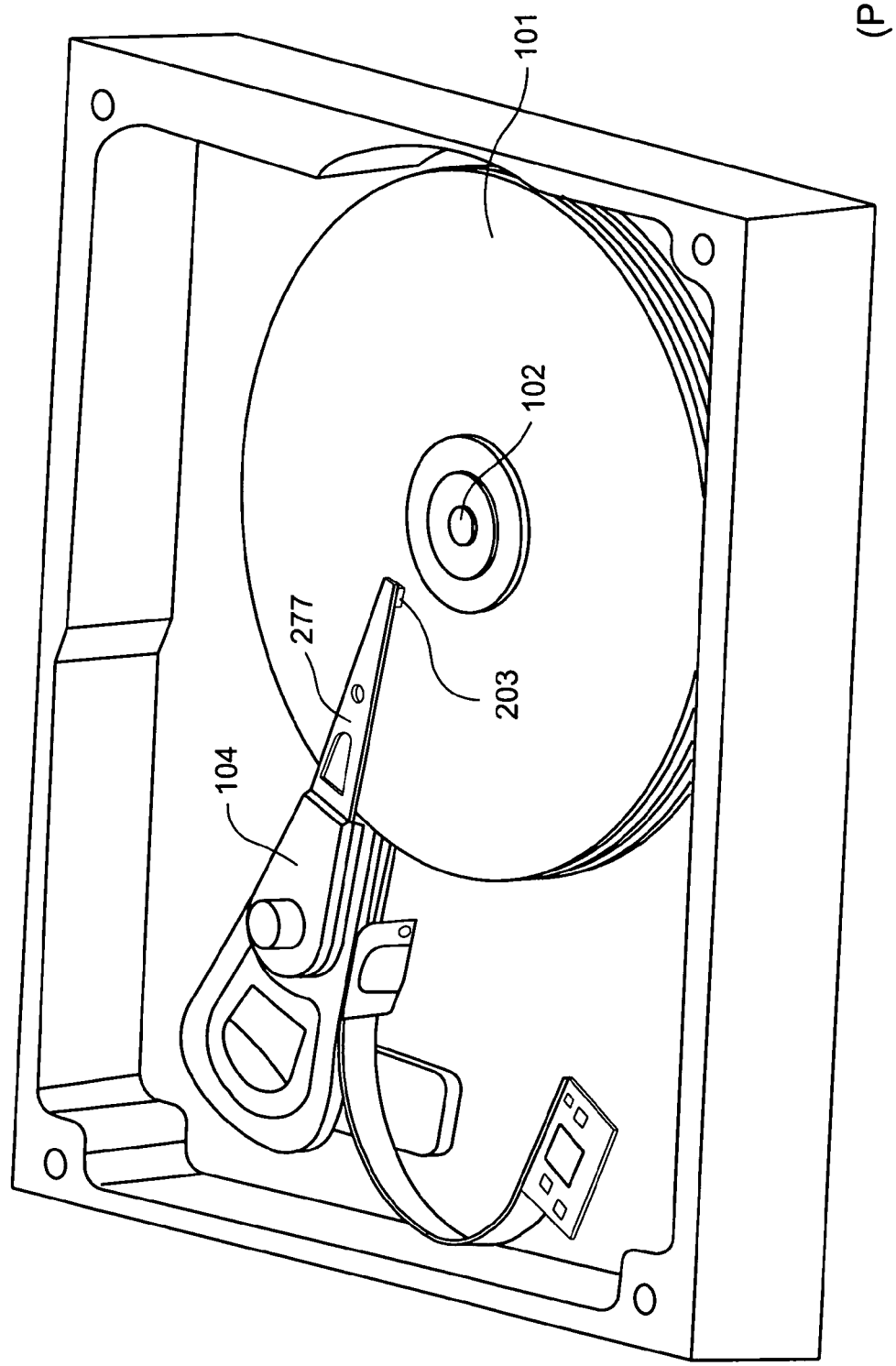
FIG. 1 is a perspective view of a conventional disk drive unit.
Figure 2:
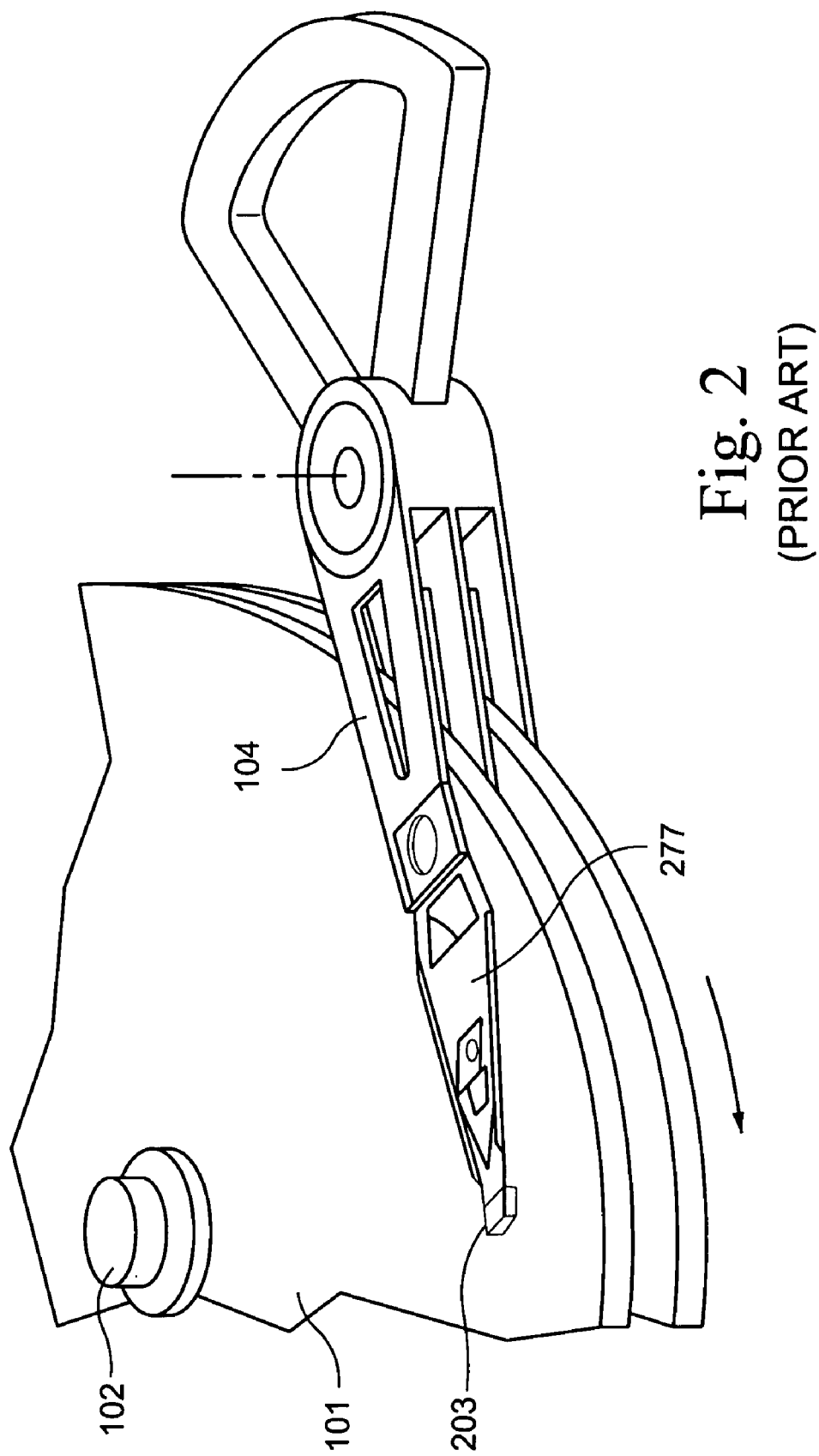
FIG. 2 is a partial perspective view of the conventional disk drive unit shown in FIG. 1.
Figure 2A:
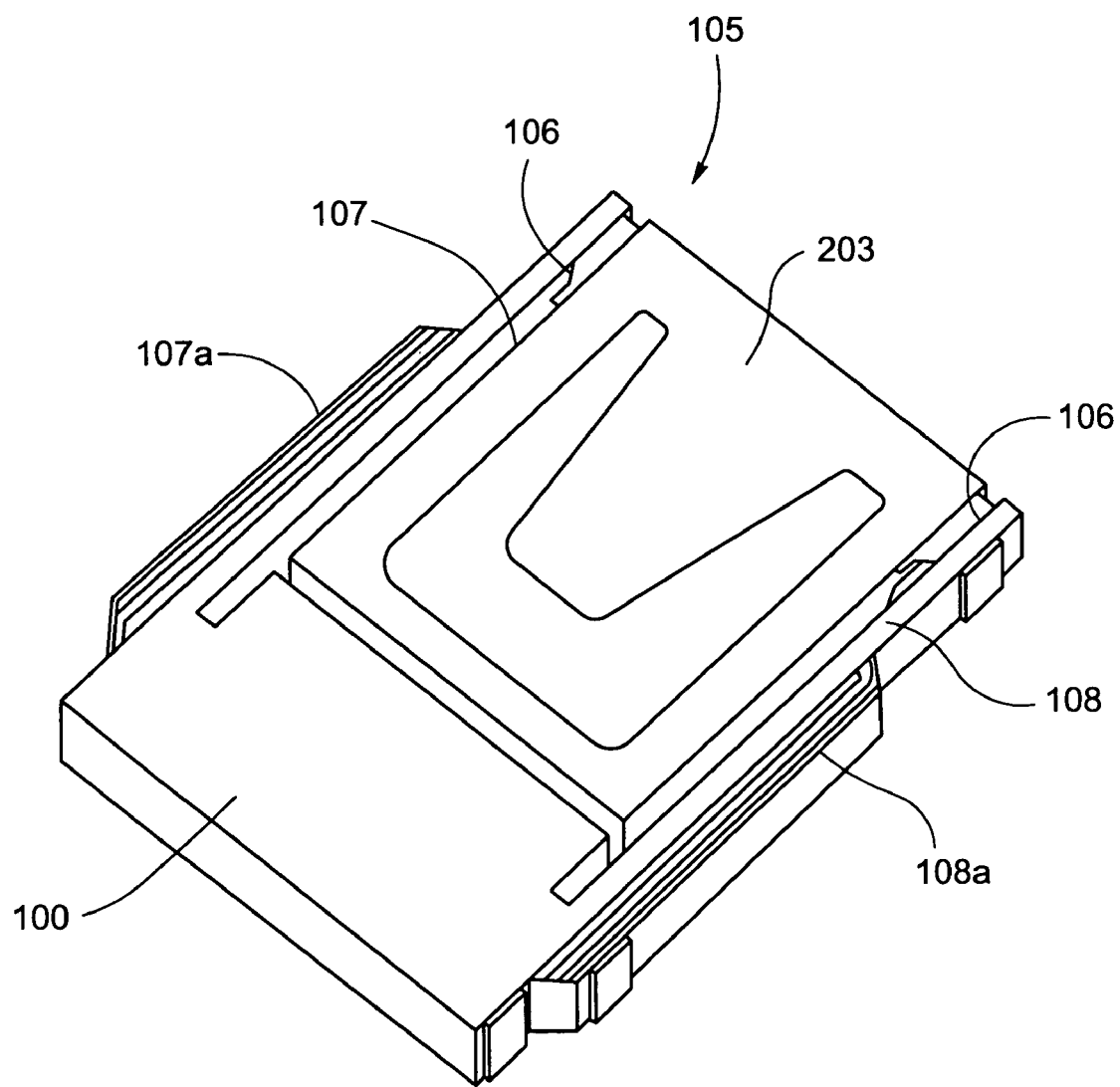
FIG. 2a shows a conventional U-shaped micro-actuator design.
Figure 2B:
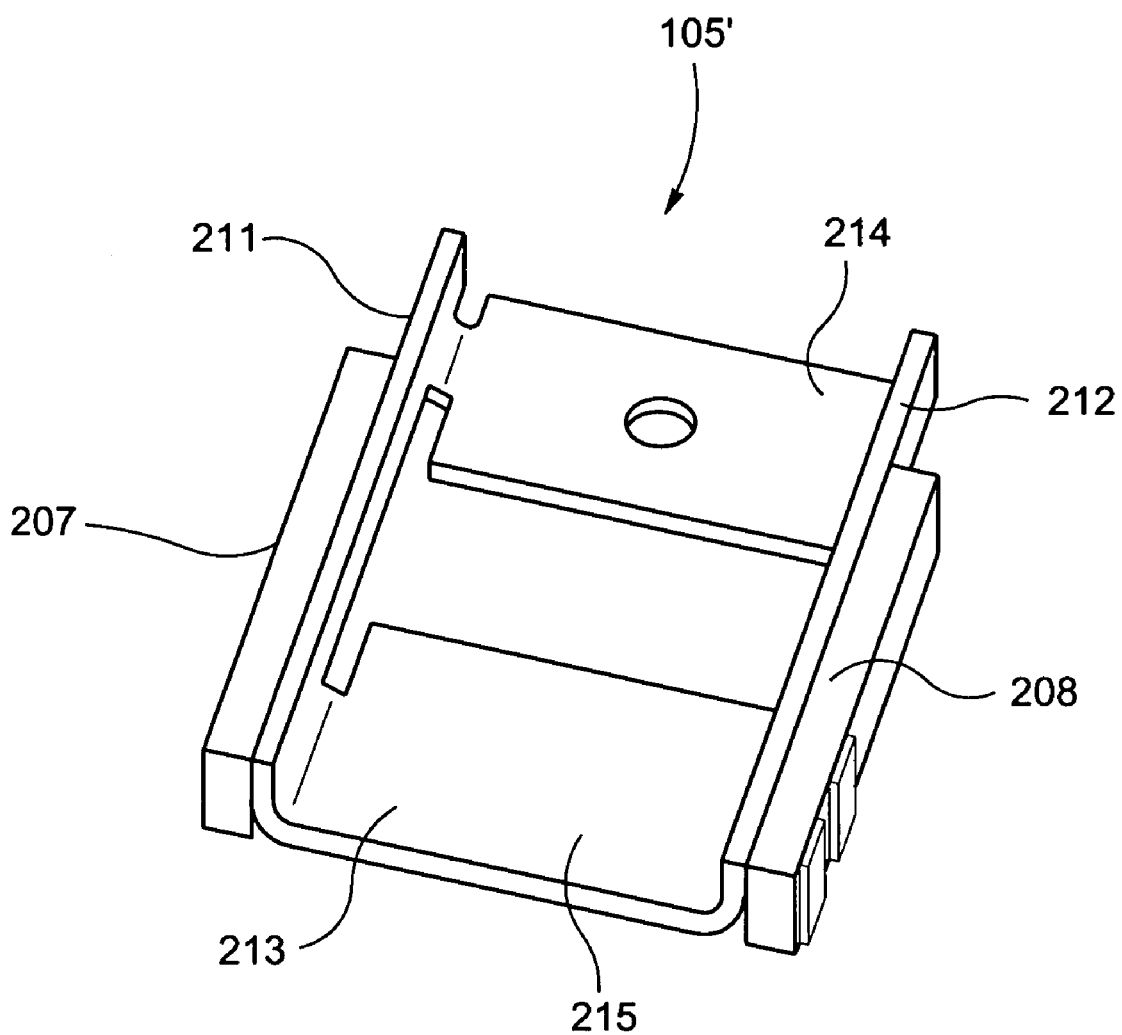
FIG. 2b shows another conventional U-shaped micro-actuator design.
Figure 2C:
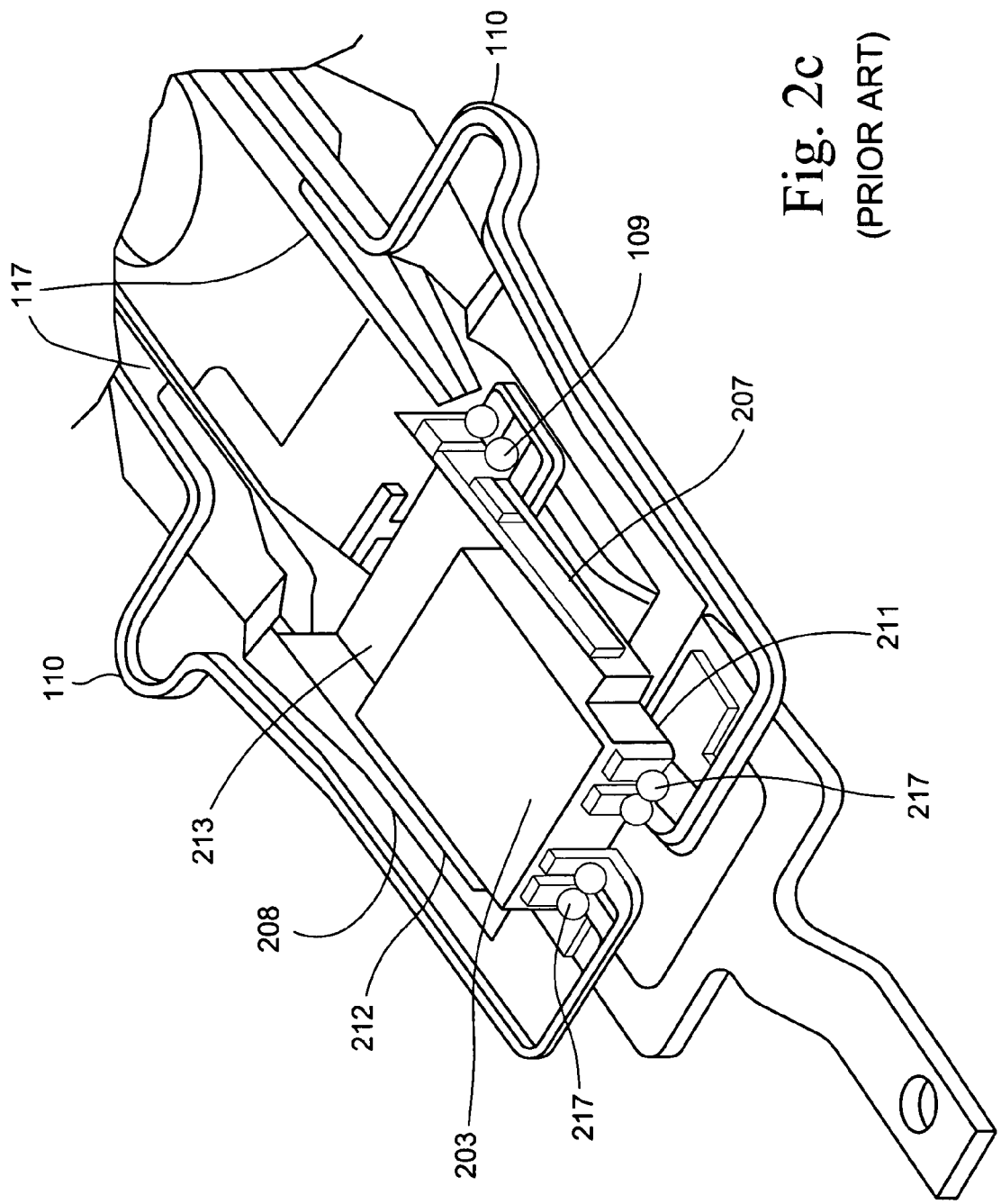
FIG. 2c is an enlarged perspective view of a conventional HGA of the disk drive from FIGS. 1 and 2.
Figure 3A:
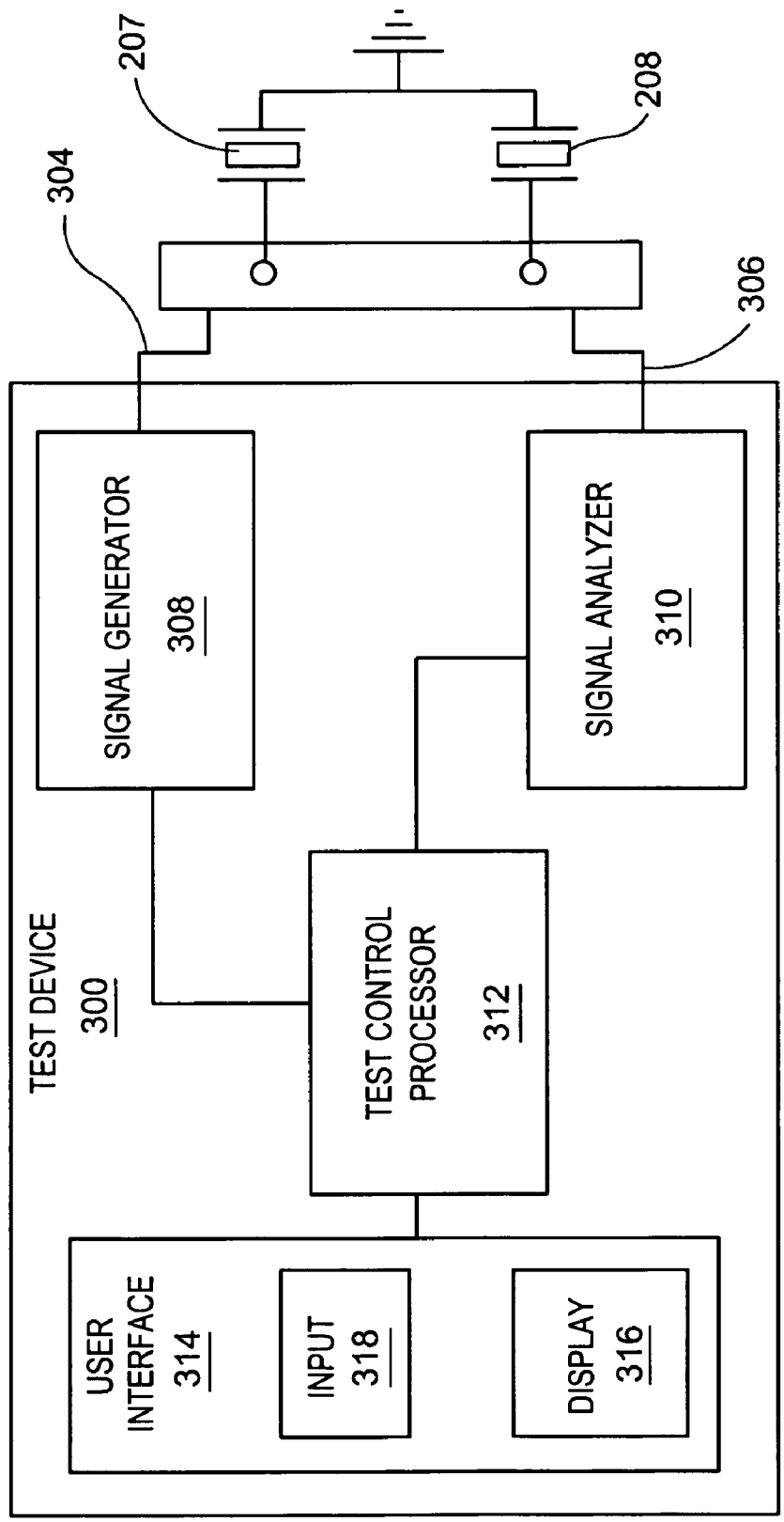
FIG. 3a is a prior art test device for detecting errors on a HGA having two PZT elements.
Figure 3B:
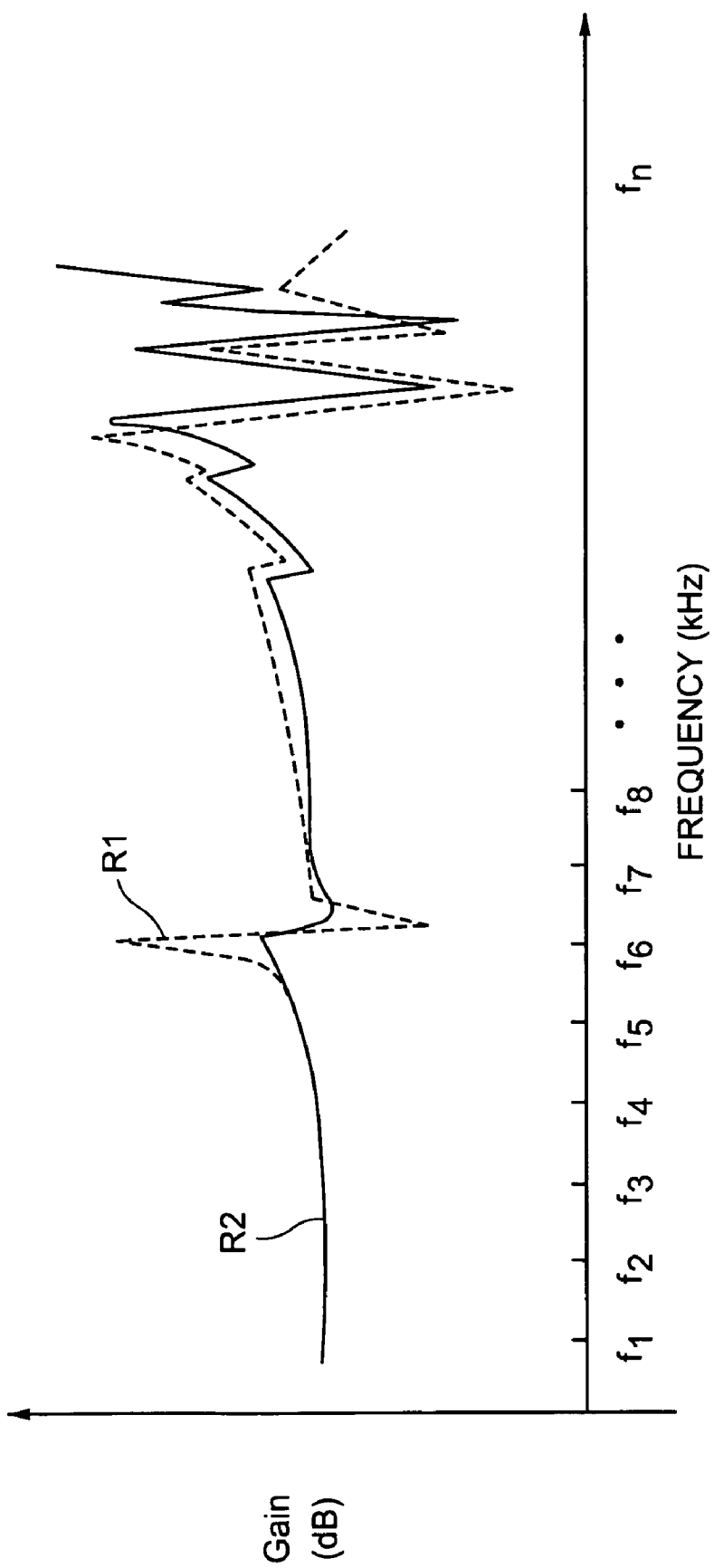
Figure 4A:
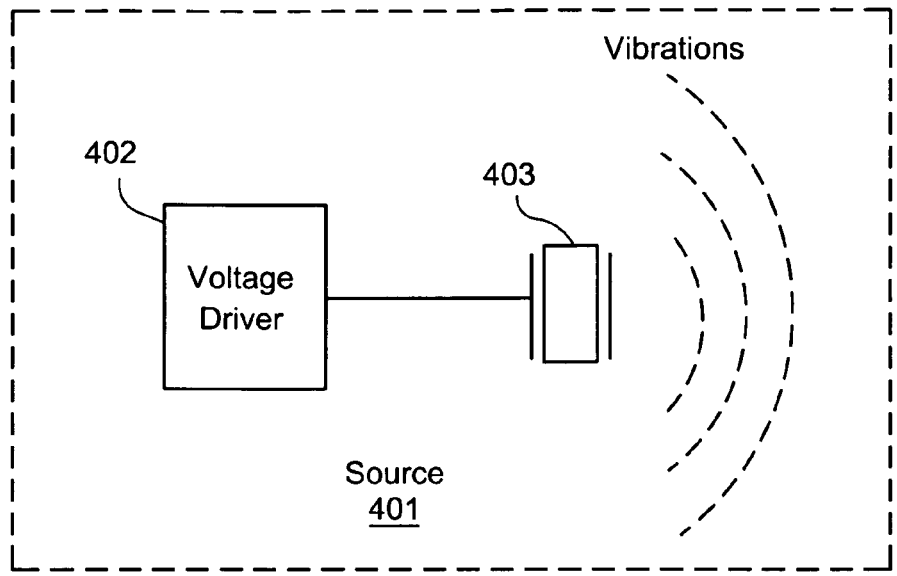
FIGS. 4a and 4b show an illustrative source device of a testing system according to certain example embodiments.
Figure 4B:
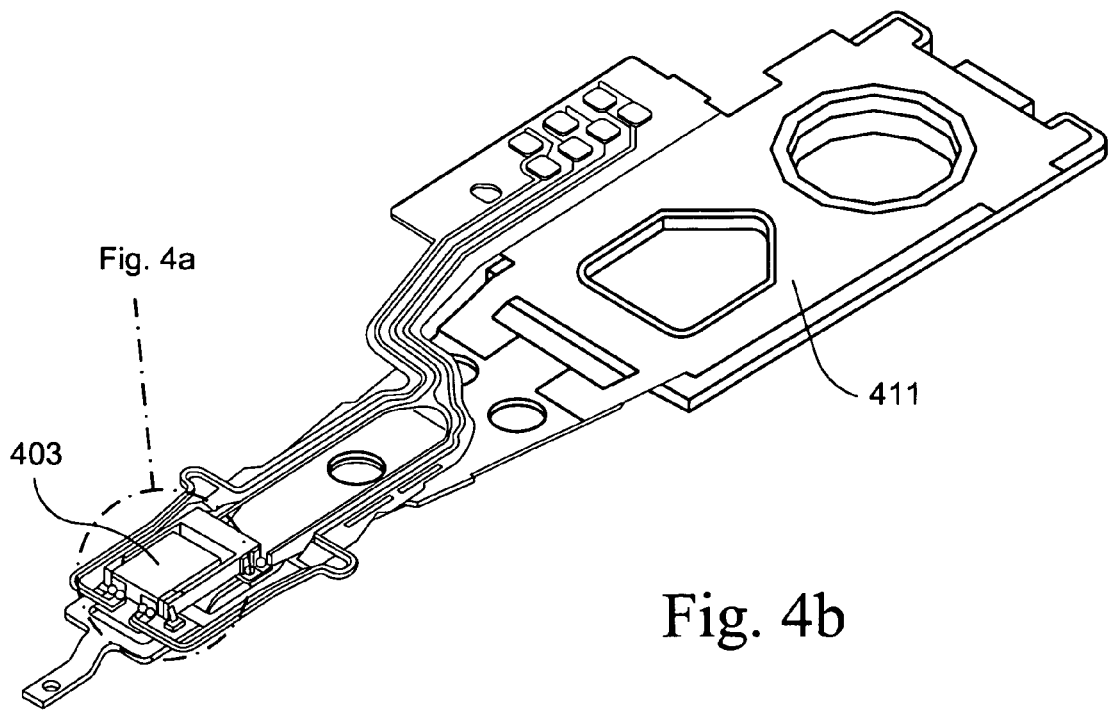
Figure 4C:
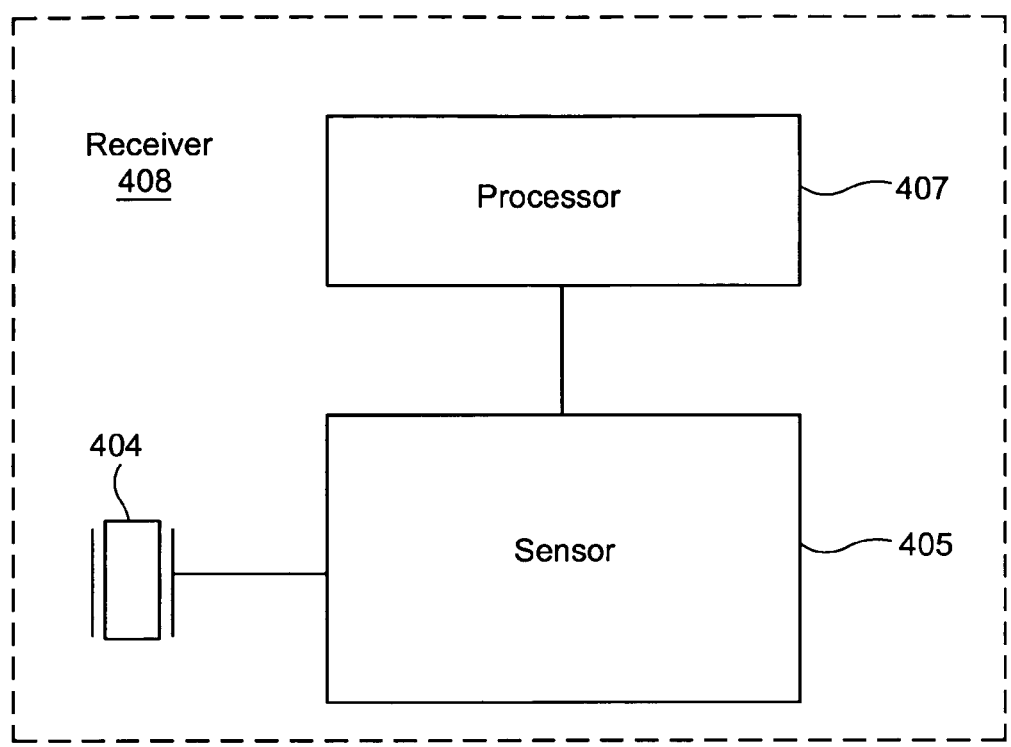
FIGS. 4c and 4d show an illustrative receiver device of a testing system according to certain example embodiments.
Figure 4D:
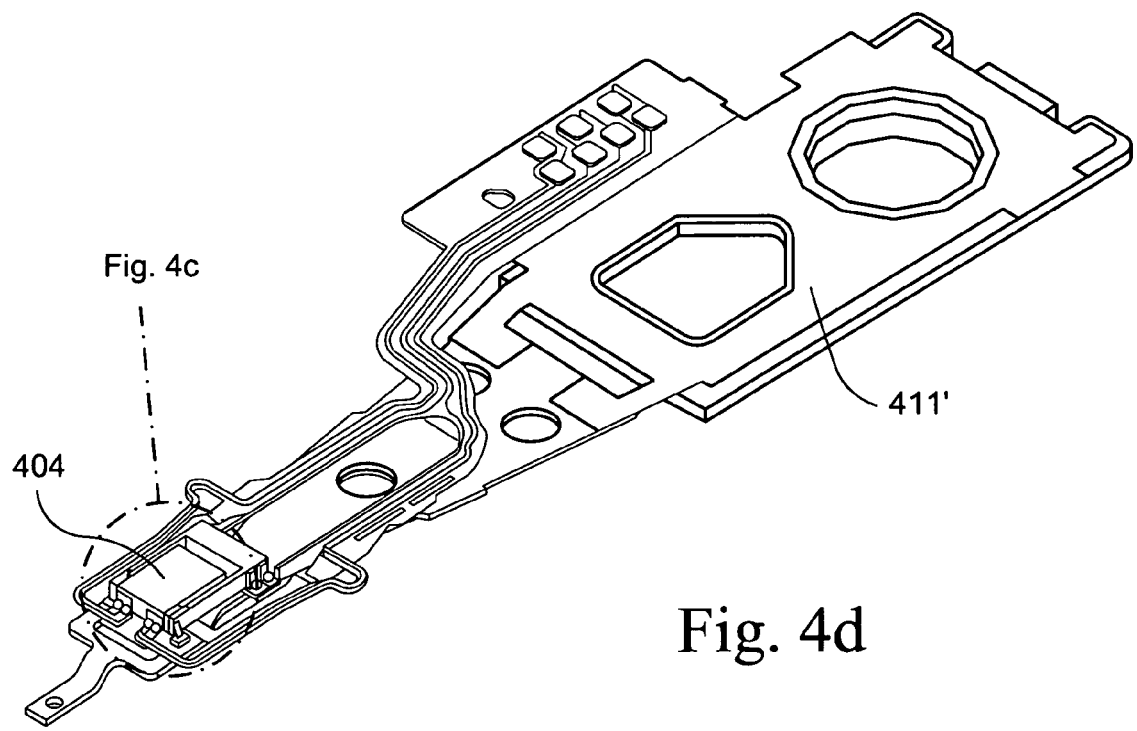

FIGS. 4a and 4b show an illustrative source device 401 of a testing system according to certain example embodiments, and FIGS. 4c and 4d show an illustrative receiver device of a testing system according to certain example embodiments. The source device 401 includes a voltage driver 402, configured to provide a voltage to a reference micro-actuator 403 of a reference HGA 411. The receiver device 408 includes a sensor 405, a processor 407, and a test micro-actuator 404 operably connected to the test HGA 411'.

When the reference micro-actuator 403 of the reference HGA 411 is driven by the voltage driver 402 of the source device 401, the PZT element of the reference micro-actuator 403 will vibrate and generate a vibration waveform with a fixed frequency. That waveform will travel through the air, as shown in FIG. 4a. The PZT element of the test micro-actuator 404 of the test HGA 411' operably connected to the receiver device 408 will receive this waveform. Because the frequency of the test HGA 411' and the reference HGA 411 are same, the test HGA 411' should receive the waveform and generate a response resonance in the PZT element of the test micro-actuator 404. That response resonance should indicate the performance characteristics of the test micro-actuator 404 of the HGA 411'. For example, if the resonance frequency shifts or if there is a gain or loss in amplitude, the PZT element of the test micro-actuator 404 of the test HGA 411' may be damaged or defective, as indicated by the change in the response characteristics of the PZT element.

Figure 5A:
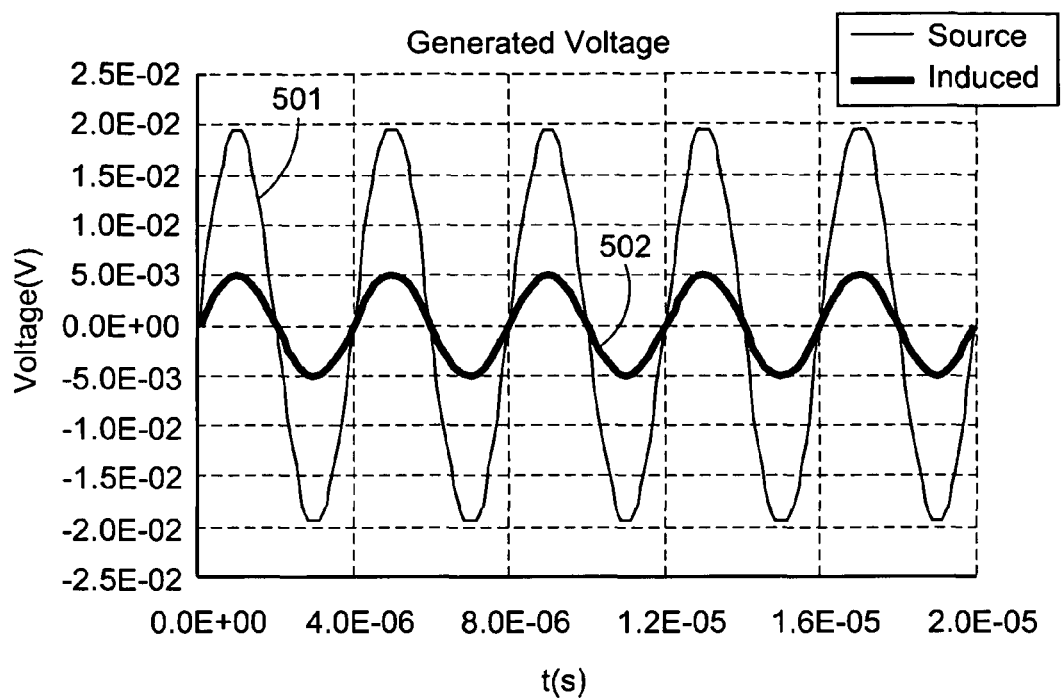
FIG. 5a is one example of illustrative testing data generated by testing systems according to certain example embodiments.

FIG. 5a is one example of illustrative testing data generated by testing systems according to certain example embodiments. When a sine drive voltage 501 is applied to the PZT element of the reference micro-actuator 403, the reference micro-actuator 403 will vibrate and generate a resonance waveform. In this example, the frequency is approximately 25 kHz, although it will be appreciated that other frequencies may be produced. This waveform will be transmitted through the air. The test micro-actuator 404 in the receiver device 408 will receive this waveform and respond by inducing resonance 502. This induced resonance 502 should have the same frequency as the drive voltage applied by the voltage driver 402 and the resonance frequency of the reference micro-actuator 403.

Figure 5B:
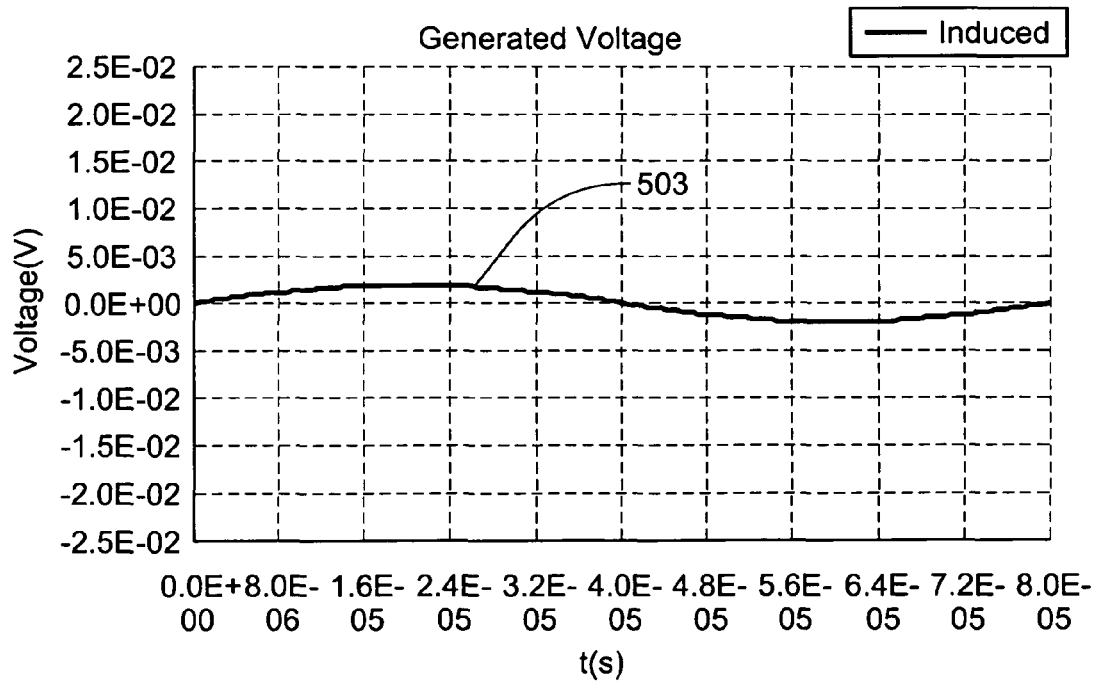
FIG. 5b is another example of illustrative testing data generated by testing systems according to certain example embodiments.

FIG. 5b is another example of illustrative testing data generated by testing systems according to certain example embodiments. Induced voltage 503 corresponds to the resonance of the test HGA 411'. As shown in FIG. 5b, the frequency of the induced resonance voltage 503 is 12.5 kHz, which is lower than the resonance frequency of the reference micro-actuator 403. Because the micro-actuator 403 is used as the reference, the difference may indicate that the test micro-actuator 404 has a structural problem, such as, for example, a micro-crack or other defect.

Figure 6:
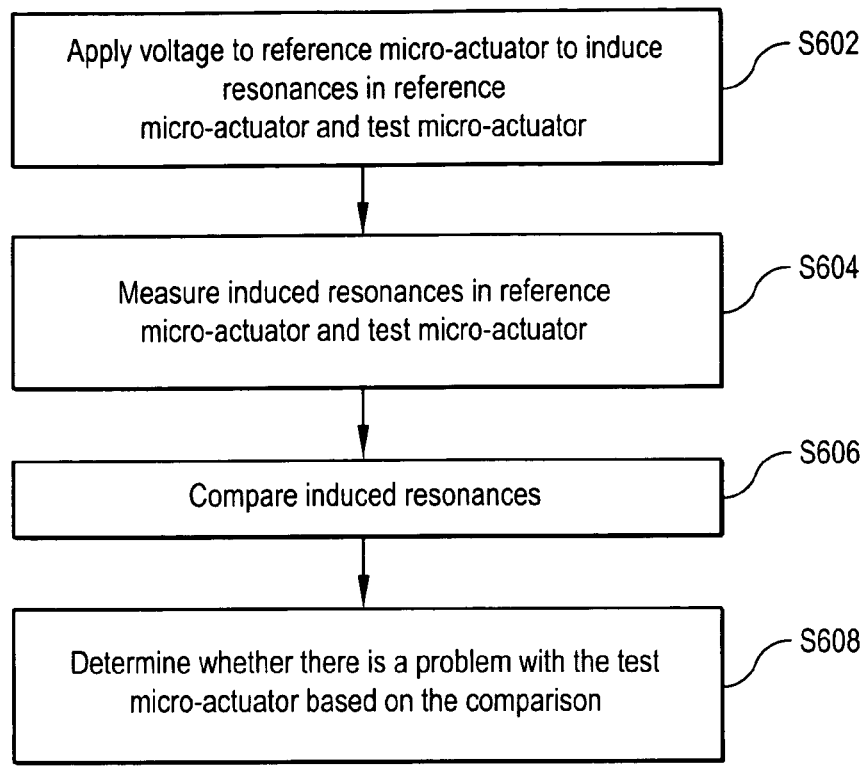
FIG. 6 is an illustrative flowchart showing a process for testing micro-actuators in accordance with an example embodiment.

FIG. 6 is an illustrative flowchart showing a process for testing micro-actuators in accordance with an example embodiment. In step S602, a voltage is applied to the reference micro-actuator. This will induce a resonance in reference micro-actuator, which, in turn, will induce a resonance in the test micro-actuator. The resonances induced in the reference micro-actuator and the test micro-actuator may be measured in step S604 and then compared in step S606. Based on the comparison, in step S608, it may be determined whether a problem with the test micro-actuator exists. The comparison may include, for example, comparisons of amplitude, frequency, phase shift, etc.

Figure 7:
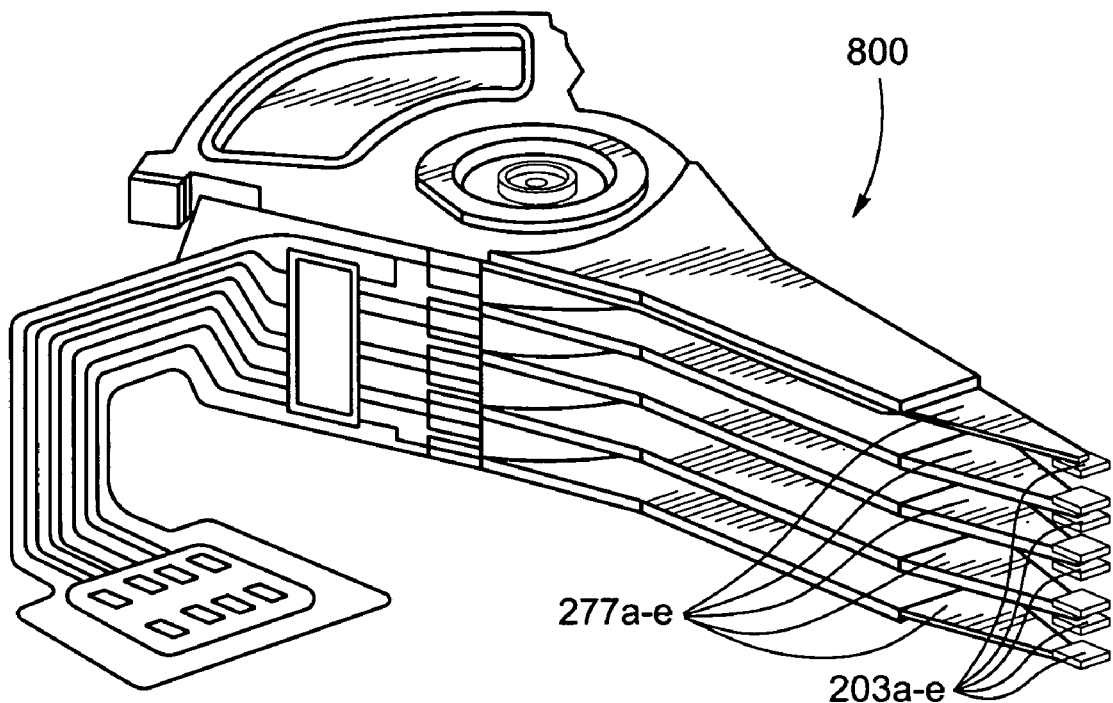
FIG. 7 is a partial perspective view of a head stack assembly, which may be subjected to the testing techniques of certain example embodiments.

As described above, the voltage driver may be a single HGA, although the invention is not so limited. For example, certain example embodiments may test an entire HSA. FIG. 7 is a partial perspective view of a head stack assembly 800, which may be subjected to the testing techniques of certain example embodiments. Because the HSA 800 includes multiple heads, when the voltage driver is operated, some or all of the micro-actuators 203a-e in each of HGA 277a-e of the HSA 800 will be induced. Each of the micro-actuators 203a-e, in turn, will generate a response resonance. One-by-one, the characteristics of each PZT element of each micro-actuator can be identified and compared to the others. Thus, the entire HSA 800 may effectively serve as a reference in certain example embodiments. Certain other example embodiments may implement other comparisons (e.g., those described below with reference to FIG. 8) in addition to, or in place of, these comparison techniques.

Figure 8:
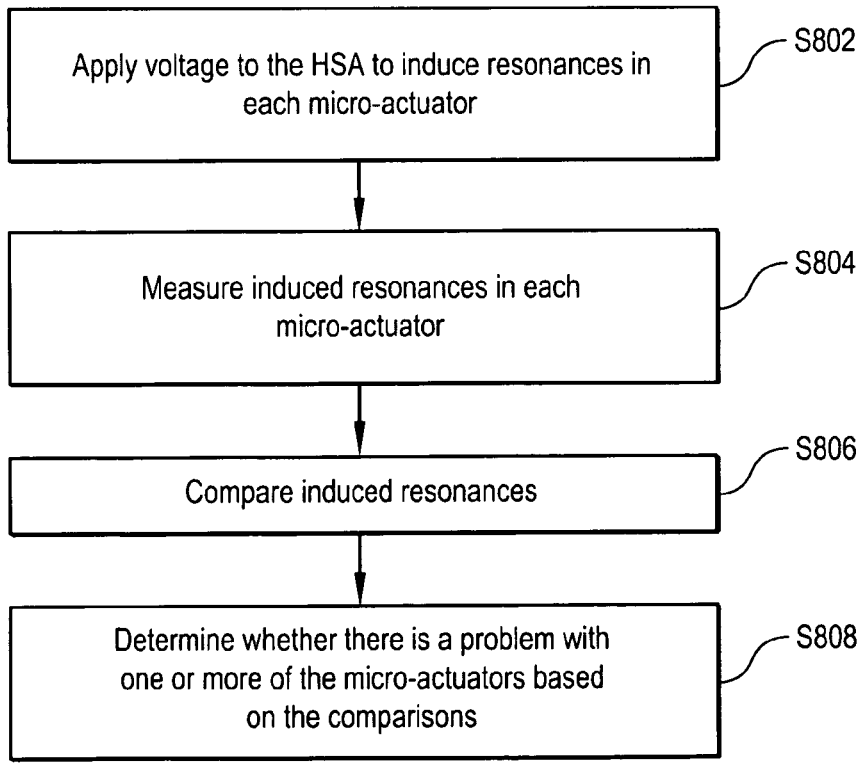
FIG. 8 is an illustrative flowchart showing a process for testing the micro-actuators of an HSA in accordance with an example embodiment; and, FIG. 9 is a perspective view of a disk drive unit, which may be subjected to the testing techniques of certain example embodiments.

FIG. 8 is an illustrative flowchart showing a process for testing the micro-actuators of an entire HSA in accordance with an example embodiment. In step S802, a voltage may be applied to the HSA so as to induce resonances in each micro-actuator of each HGA of the HSA. The resonances induced in each micro-actuator may be measured in step S804, and one or more comparisons of the induced resonances may be conducted in step S806. The comparisons may include a series of paired comparisons, a comparison to the average induced resonance, a comparison to an estimated reference resonance, etc. Alternatively or in addition, one or more resonances may be designated reference resonances to which all other observed resonances are compared. In step S808, it is determined whether a problem exists with one or more of the micro-actuators based on the comparisons.

Figure 9:
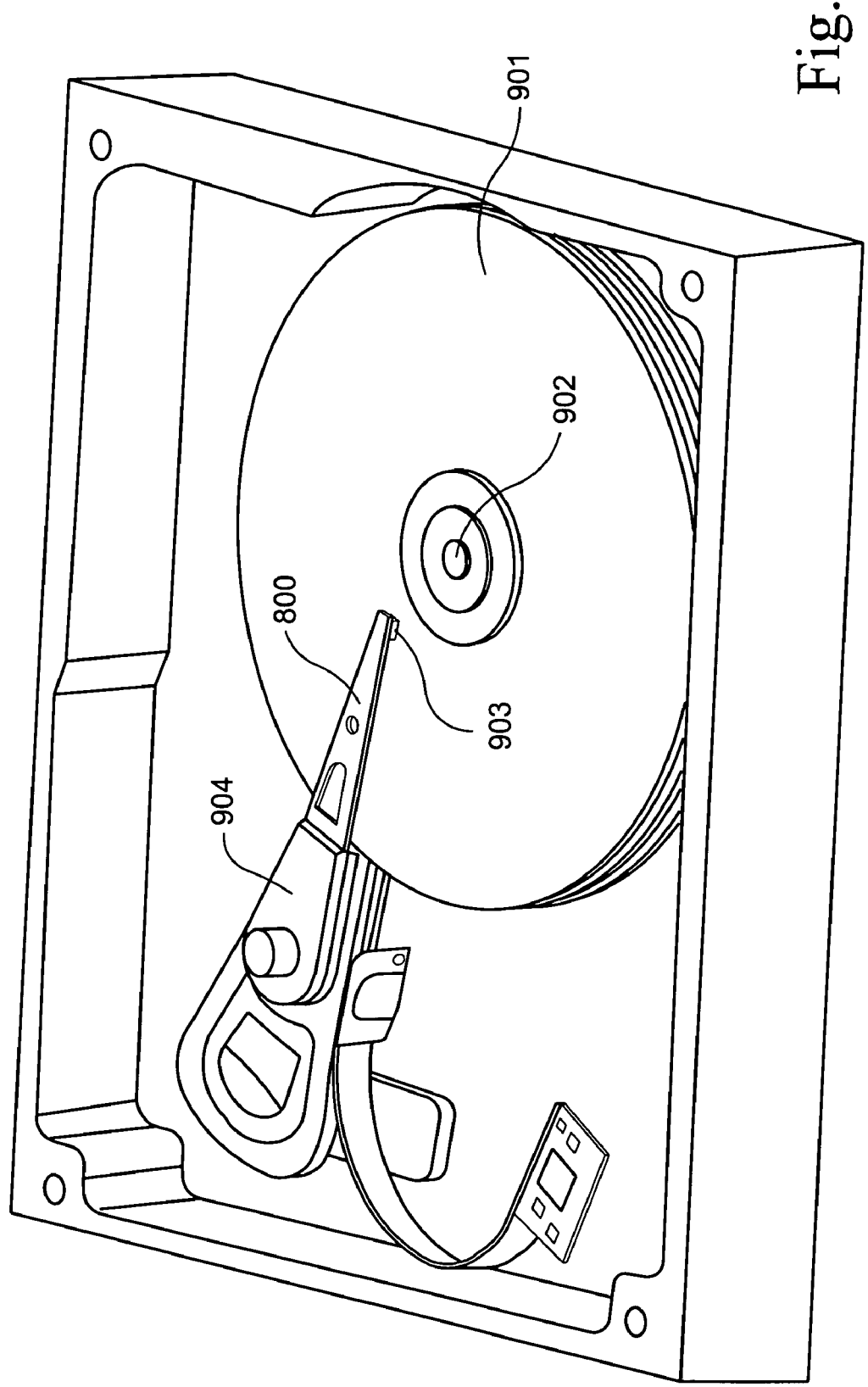

The techniques described with reference to FIGS. 7 and 8 may be applied to an HSA already located in a hard disk drive, as indicated by FIG. 9. FIG. 9 illustrates a disk drive unit with a magnetic disk 901 mounted on a spindle motor 902 for spinning the disk 901. A voice coil motor arm 904 carries the HSA 800, which includes a series of HGAs, each having a micro-actuator with a slider 903 incorporating a read/write head. A voice-coil motor (VCM) is provided for controlling the motion of the motor arm 904 and, in turn, controlling the slider 903 to move from track to track across the surface of the disk 901, thereby enabling the read/write head to read data from or write data to the disk 901. Again, voltages can be applied, and the characteristics of each induced resonance may be identified and compared.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A system for identifying problems with a PZT element of a micro-actuator, comprising:
    a voltage driver operably connected to a reference micro-actuator, the voltage driver being configured to cause the reference micro-actuator to vibrate at a reference resonance;
    a test micro-actuator, configured to vibrate at a test resonance when induced by vibrations from the reference micro-actuator; and,
    a processor, configured to compare at least one characteristic of the reference resonance and at least one corresponding characteristic of the test resonance.

2. The system of claim 1, wherein the voltage driver is configured to apply a sine voltage to the reference micro-actuator.

3. The system of claim 1, wherein the at least one characteristic of the reference resonance and the at least one corresponding characteristic of the test resonance are one or more of: frequency, amplitude, and phase.

4. The system of claim 1, wherein each micro-actuator is located within a disk drive device, the disk drive device comprising:
    a head stack assembly including a plurality of head gimbal assemblies, each head gimbal assembly having a slider with a read/write head thereon and a drive arm connected to the head gimbal assembly;
    a disk operable to be read from and/or written to by said read/write head; and,
    a spindle motor operable to spin the disk.

5. The system of claim 4, wherein the reference micro-actuator is one micro-actuator in the head stack assembly, and wherein all other micro-actuators are test micro-actuators.

6. A method for identifying problems with a PZT element of a micro-actuator, the method comprising:
    providing a reference micro-actuator and a test micro-actuator;
    applying a voltage to the reference micro-actuator to induce a reference resonance in the reference micro-actuator, the reference resonance causing a test resonance in the test micro-actuator;
    measuring the reference resonance and the test resonance; and,
    comparing at least one characteristic of the reference resonance and at least one corresponding characteristic of the test resonance.

7. The method of claim 6, further comprising determining whether there is a problem with the test micro-actuator based on the comparing step.

8. The method of claim 6, wherein the voltage is a sine voltage.

9. The method of claim 6, wherein the at least one characteristic of the reference resonance and the at least one corresponding characteristic of the test resonance are one or more of: frequency, amplitude, and phase.

10. A method for identifying problems with a PZT element of a micro-actuator of a disk drive device including a head stack assembly including a plurality of head gimbal assemblies, each head gimbal assembly having a slider with a read/write head thereon and a drive arm connected to the head gimbal assembly, the method comprising:
    applying a voltage to the head stack assembly to induce resonances in each micro-actuator;
    measuring the induced resonances in each micro-actuator;
    generating a reference resonance; and,
    comparing at least one characteristic of the induced resonances with at least one corresponding characteristic of the reference resonance.

11. The method of claim 10, further comprising determining whether there is a problem with one or more of the micro-actuators based on the comparing step.

12. The method of claim 10, wherein the voltage is a sine voltage.

13. The method of claim 10, wherein the at least one characteristic of the induced resonances is one or more of: frequency, amplitude, and phase.

14. The method of claim 10, further comprising estimating the reference resonance based at least in part on the voltage applies.

15. The method of claim 10, further comprising averaging the induced resonances to generate the reference resonance.

16. The method of claim 10, further comprising designating one induced reference as the reference resonance.

17. The method of claim 10, wherein the reference resonance rotates among the induced resonances such that the comparing step includes comparing each induced resonance to every other induced resonance.

* * * * *